July 10, 1934. L. A. M. PHELAN ET AL Re. 19,235

ELECTRICAL APPARATUS

Original Filed Dec. 23, 1922 2 Sheets-Sheet 1

Inventors:
Louis A. M. Phelan
Clifford Hotchkiss.

By Jones, Addington, Ames, + Seibold Attys.

July 10, 1934. L. A. M. PHELAN ET AL Re. 19,235

ELECTRICAL APPARATUS

Original Filed Dec. 23. 1922 2 Sheets-Sheet 2

Inventors:
Louis A. M. Phelan
Clifford Hotchkiss.

By Jones, Addington, Ames & Seibold Attys.

Reissued July 10, 1934 Re. 19,235

UNITED STATES PATENT OFFICE 19,235

ELECTRICAL APPARATUS

Louis A. M. Phelan, Chicago, Ill., and Clifford Hotchkiss, Elkhart, Ind., assignors, by mesne assignments, to Minneapolis-Honeywell Regulator Company, Minneapolis, Minn., a corporation of Delaware Original No. 1,676,921, dated July 10, 1928, Serial No. 608,703, December 23, 1922. Application for reissue July 9, 1930, Serial No. 466,896

36 Claims. (Cl. 200—139)

Our invention relates to electrical switches designed particularly for the regulation or control of electrical circuits, such as may be used in connection with heating, cooling or alarm apparatus and systems.

The subject matter of this invention has reference to a device making use of a liquid electrical contactor tube, which comprises a container in which are mounted spaced electrodes adapted to be bridged by a body of mercury when the container is properly actuated.

Our invention makes use of an electrical contactor of the above mentioned type, mounted in conjunction with an expansible and contractible element, such as heat or pressure responsive devices, or as curved pressure tubes and thermostatic elements. The pressure responsive or thermostatic element is designed to support and serve to actuate the electrical contactor into or out of circuit closing position when a pressure or temperature change of a predetermined amount occurs.

More particularly our device refers to an electric switch of this type in which the pressure or thermostatic element is unusually efficient, accurate and rapid in operation.

A further particular object of our invention is to provide a ready means for adjusting the above type of device to operate at required predetermined conditions.

Another object of our invention is to produce a contactor tube of the above character, which may be readily mounted upon an actuating device which has available a very small quantity of energy for actuating the contactor tube and which will require only a small change in pressure or temperature for its actuation.

A further object of our invention is to provide a switch device of the type indicated, that will be simple and economical to construct and which will possess great durability, even when subjected to mechanical abuse and when used in connection with considerable quantities of electric current at substantial voltages.

Also further objects and advantages will appear from the following specification and accompanying drawings, in which—

Figure 1:
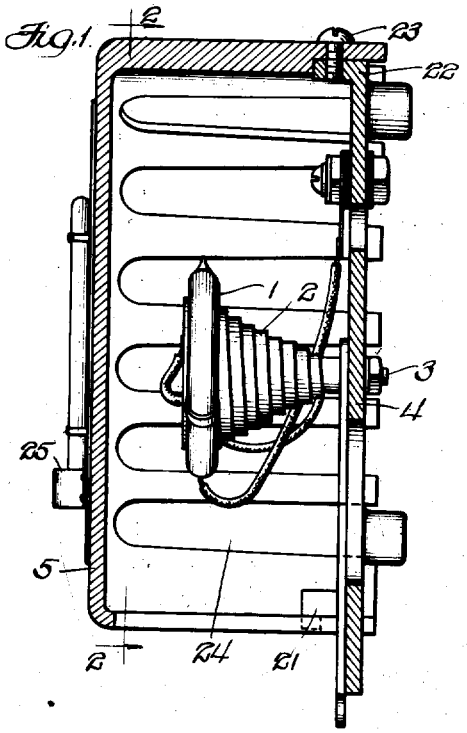
Figure 1 is an elevation view partly in section of my invention.
Figure 2:
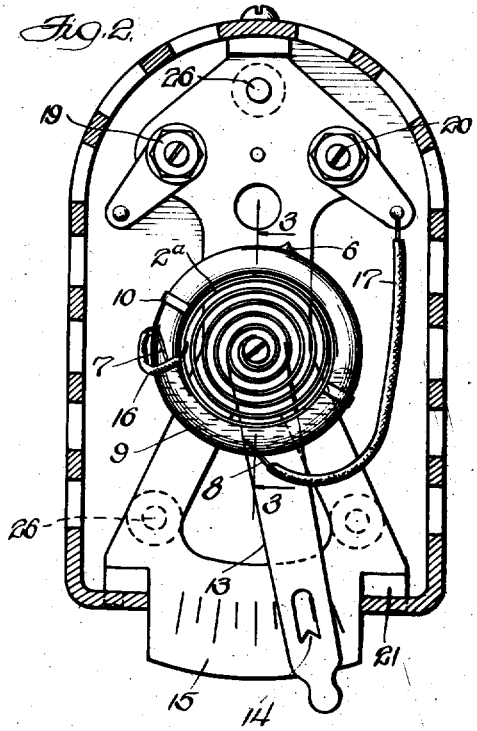
Fig. 2 is a sectional view taken on line 2—2 of Fig. 1.

In a general way our invention, as shown in Fig. 1, comprises the liquid contactor tube 1 mounted upon a conical spiral thermostatic bimetallic element 2, which in turn is pivotally mounted at 3 to the frame or support 4. A cover 5 serves to protect and enclose the device.

The tube 1 is constructed in a substantially toroidal form, preferably in the form of a torus. After the various parts in the tube are in place, the tube is evacuated and filled with an inert gas and sealed off through the tip 6. Electrodes 7 and 8 are inserted and sealed in the walls of the tube and may be formed of platinum or of Dumet wire covered or plated with casings of pure iron or the like metal which is unaffected by the arcing obtaining in the tube in the presence of the mercury and the mercury vapor. A body of conducting fluid 9, preferably mercury, may substantially fill the lower half of the container 1 and is normally in contact with the electrode 8. When the tube is tilted in the proper direction, the body of mercury 9 will come into bridging relation with the electrodes 7 and 8, thus closing an electrical circuit through the tube.

Since the tube is of toroidal form and is mounted to be tilted substantially about its geometrical axis, it will be noted that the body of mercury 9 will remain practically stationary and of constant shape when the tube is tilted into or out of circuit making position. In other words, the body of conducting fluid 9, as well as the tube 1, retain a substantially stationary center of gravity when the tube is actuated. Hence it is obvious that very little energy is required either to initially move the tube or to return the tube to its normal position, since the parts remain practically balanced at all times. In the former types of liquid contactor tubes, it has been necessary to displace a fairly large mass of heavy liquid in order to actuate the device. Such contactors have the further disadvantage that an appreciable temperature change is required to restore the parts including the body of conducting liquid to their normal position after once actuated.

The tube 1 is mounted concentric with the outer turn 2a of spiral element 2 by means of detachable clips 10 comprising flexible bands of copper or similar material soldered or otherwise fixed to the spiral turn 2a and clasped around the tube 1 at opposite and spaced points. It will be noted that this structure forms a very simple, compact and easily assembled arrangement of the contactor tube and the thermostatic element.

The spiral element 2 is preferably constructed of a bi-metallic ribbon composed of layers of any suitable metals or alloys, such as brass and nickel, and is wound substantially in the shape of a conical or helical spiral as shown. This form of winding has a particular advantage over the more usual simple spiral form in that a much larger portion of the surface area of the thermostatic ribbon or heat responsive element is directly exposed to the atmosphere and air currents. This is an important consideration when this type of device is used for accurate and rapid temperature regulation. This form of conical spiral mounting has a further advantage in the present structure, in that it makes possible a more convenient arrangement of the lead wires to the contactor tube and permits the contactor tube to be flexibly mounted at a central position in the casing remote from any of the fixed parts of the structure which would possibly hit against and break the glass tube.

The inner end of the spiral element 2 is mounted upon a pivoting shaft 3 which is retained in a frame 4 by a nut 3a and washer 3b. A collar 11 surrounds the pivoting screw 3 and is fixed to the spiral element 2 by solder or by means of a screw 12.

The collar 11 is provided with an extension 13 which forms a handle for adjusting the angular position of the tube 1 and the spiral element 2 about its pivoting shaft 3. The handle 13 extends to the exterior of the casing and is provided with a pointer 14 co-operating with a calibrated scale 15 formed on an extension of the frame 4.

The electrodes 7 and 8 are connected in the circuit, respectively, by the flexible lead wires 16 and 17. The flexible wire 16 is attached to the outer end of the spiral element 2 so that the electric current flowing in the circuit will traverse this element for the particular purpose hereinafter described. From the spiral element 2 the circuit continues through frame 4 to a binding post 19. The flexible lead 17 is connected to a binding post 20. The binding posts 19 and 20 serve to connect the device to the desired external circuit.

The cover 5 is attached to the frame 4 by means of lugs 21 formed integral with the lower end of the frame 4 and by a lug 22 formed at the upper end of the frame 4 and engaged by a screw 23. Openings 24 are provided in the cover 5 for the purpose of permitting free circulation of air currents about the thermostatic element 2. The cover 5 is provided with a thermometer 25 which serves as a guide when adjusting the switch to actuate at a desired temperature.

Screw holes 26 may be provided in the frame 4 for mounting the device upon a wall or partition surface.

Figure 4:
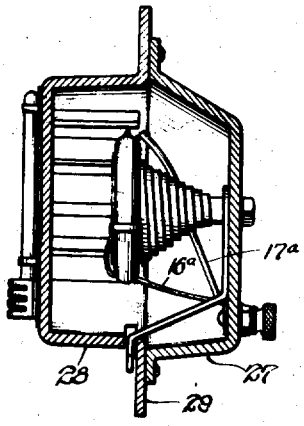
Fig. 4 shows a modification having a special type of casing.

In Fig. 4, the device is shown mounted in a modified form of casing. The casing here consists of a body portion 27 and a cap portion 28 having a flange 29, which is intended to be mounted flush with a wall surface.

Figure 5:
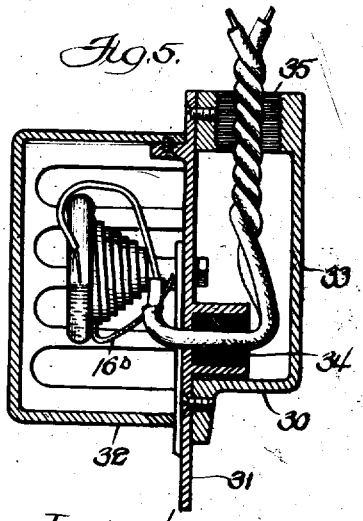
Fig. 5 shows a modification having still another type of casing or housing.

In Fig. 5, the device is shown mounted in another modified form of casing, comprising a rear enclosing frame 30, a mounting plate 31, and a cover portion 32. The rear frame 30 constitutes a weather-proof connection box for the electrical leads and is provided with a threaded opening 35 for a conduit connection.

Figure 6:
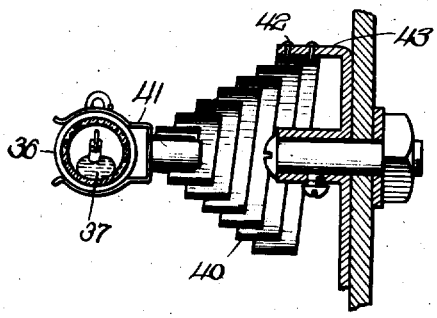
Fig. 6 is a detail sectional view similar to Fig. 3, taken along the line 6—6 of Fig. 7, but showing a modified form of thermostatic element and contactor tube.
Figure 7:
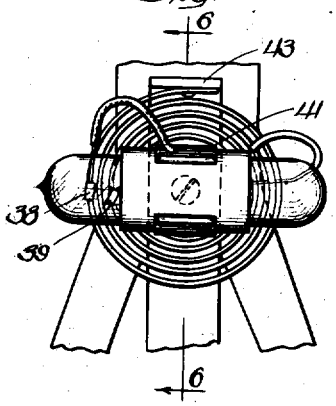
Fig. 7 is a front view of the device of Fig. 6.

In Figs. 6 and 7, a modified structure is shown in which a cylindrical contactor tube 36 is used. The tube 36 is designed to be normally located in a position neighboring the horizontal and upon being tilted, a body of mercury 37 is designed to flow into and out of bridging relation with a pair of electrodes 38 and 39 which are connected in circuit in the manner of electrodes 7 and 8 above described. A contactor tube of this type has been found to be accurately responsive to very slight changes in its angular position and consequently is desirable for use where only small changes in temperature occur. The tube 36 is mounted upon a spiral element 40 by means of a spring clip 41. It will be noted that the spiral element 40 is shown in an inverted position from that shown in Fig. 1, in order to accommodate more readily the cylindrical type of contactor tube. The spiral element 40 is attached by means of rivets 42 to a supporting arm 43.

Figure 8:
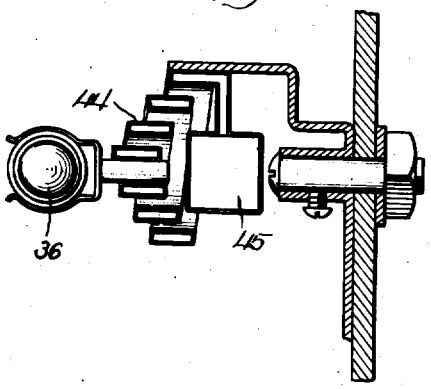
Figs. 8 and 9 are detail sectional views of further modifications.

In Fig. 8, a further modification is shown in which a hollow spiral thermostatic element 44 is used. The hollow portion of this spiral element may form a continuous passage throughout the length of the spiral and may be connected at an end, if desired, with a container 45. The passage through the spiral element and the container 45 may be filled with air or other fluids, which when heated will result in a change in pressure. This pressure change will serve to alter the shape of the spiral element 44 and thus actuate the contactor tube. It will be understood that container 45 is merely disclosed as an example of a source of pressure changes and that the contactor tube and spiral element shown in Fig. 8 are capable of use with, and may be actuated by, other desired sources of varying pressure.

Figure 3:
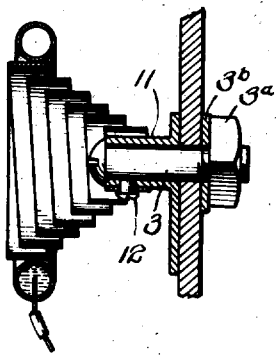
Fig. 3 is a detail sectional view taken on line 3—3 of Fig. 2.
Figure 9:
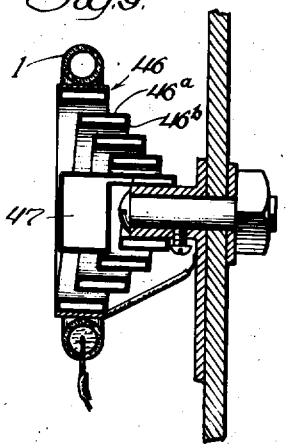

In Fig. 9, a modification is shown embodying features shown in Figs. 3 and 8. A hollow spiral element 46 is shown having outer and inner walls 46a and 46b composed respectively of materials having different coefficients of expansion. This spiral element may also be attached to a source of variable pressure, such as the fluid container 47 and hence this element is subject to an alteration in shape when temperature changes occur, both because of its bi-metallic nature and because of its action as a curved pressure tube.

In all of the above described structures it will be noted that the use of bearings in the operating parts of the mountings of the contactor tubes is entirely eliminated. Consequently the spiral elements when actuating the contactor tubes, are not required to overcome any variable frictional losses as would result with the use of bearings.

The operation and one method of using the device of Fig. 1 will now be outlined. The binding posts 19 and 20 are connected directly in series with the circuit which is to be controlled such, for example, as the circuit of a motor controlled heating equipment of any of the usual and suitable types.

Assuming that the room temperature is at or near the desired point, the lever 13 is turned so that the contactor tube 1 is in a substantially neutral position ready to either close or open the circuit with a very slight change of temperature. If it is assumed that the device is being used for the regulation of heating equipments and that the room is at the desired temperature, then the heating apparatus should not be in full operation and consequently the contactor tube should be in open circuit position with the body of mercury 9 out of contact with the electrode 7. However, as the room temperature drops a predetermined amount, the thermostatic element 2 will become modified in shape because of the temperature change and will rotate the contactor tube 1 about its axis into circuit closing position.

The current to the contactor tube will now flow through the spiral element 2 and will start the operation of the heating equipment. The spiral element 2 will thereupon begin to return to its normal position and will begin to rotate the contactor tube back to its former position as a result of two causes: first, the heating equipment will have partially restored the room temperature and second, the current running through the spiral element will furnish a slight amount of heat, thus aiding in quickly bringing the temperature of the spiral element 2 back to normal.

This current heating effect obtaining in the element 2 has a particular advantage in this type of heat regulating switch which will now be outlined. When the contactor tube 1 turns to its closed circuit position it will tend to remain there for a slightly longer period than necessary due to inertia of the heating apparatus and to the time required to bring the room temperature and the temperature of the thermostatic element back to normal. This will result in a room temperature in excess of that desired before the thermostatic element is sufficiently heated to cause the heating equipment to be shut off. Hence, in order to use this type of regulating switch where the temperature must be regulated very accurately, it is advisable to supplement the action of the increased room temperature upon the spiral element 2 with the heating action of the current flowing through this element. With such a device it has been found possible to regulate the room temperature with an accuracy several degrees closer than with the former methods However, in case this type of thermostatic switch is used in connection with the control of refrigeration or cooling apparatus, it will ordinarily be connected in circuit and adjusted to open the circuit upon the occurrence of a sufficient drop in temperature. This is the opposite of its action when used with heating apparatus where it serves to open the circuit upon the occurrence of a sufficient increase in temperature. In view of these facts, the heating effect of the current through the spiral element is not required in the case of refrigeration and cooling apparatus. Consequently in the device as shown in Fig. 4, the current is not connected through the spiral element but independent lead wires 16*a* and 17*a* are provided to the binding posts. In other instances it may be desirable to pass only a portion of the total current through the spiral element and in such cases a shunt wire 16*b*, as shown in Fig. 5, may be so designed to by-pass the desired amount of current.

The terms "contactor", "liquid contactor" and "electrical contactor" as employed in the claims contained herein refer to the well known type of mercury electric switch or an equivalent thereof which comprises an hermetically sealed container having electrodes disposed therein and a body of conducting liquid, such as mercury, which serves to make and break the electric circuit between the said electrodes. The various modifications of our invention shown in the drawings are illustrative of several types of such contactors as are covered by our present invention. It is obvious, therefore, that the above-mentioned terms do not pertain to an open and exposed contact member which is movable by the coiled thermostatic element and which is adapted to control an electric circuit by cooperating with a second and fixed open contact member.

While we have shown and described several embodiments of our invention, it is to be understood that many modifications may be made therein without departing from the spirit and scope of the appended claims, and we desire that only such limitations shall be imposed upon our invention as are specifically pointed out in the claims and such as are required by the prior art.

Having thus described our invention, what we claim as new and desire to secure by Letters Patent in the United States, is:

1. An electric switch comprising a coiled expansible and contractible element, a liquid contactor wholly supported on and movable with said element, a body of conducting liquid housed in said contactor, and an adjustable supporting means for said element for adjusting the position of said contactor.

2. A thermostatic switch comprising a heat responsive element formed of conducting material, and a liquid contactor comprising a container, co-operating electrodes sealed therein and a conducting body housed in said container, said contactor being wholly supported upon one end of said element and one of said electrodes being electrically connected in circuit relationship to said element.

3. A thermostatic switch comprising a heat responsive element formed of conducting material, and a liquid contactor comprising a container, co-operating electrodes sealed therein and a conducting body housed in said container, said contactor being wholly supported upon a free end of said element, and said element being electrically connected to one of said electrodes whereby the current that may flow in said circuit serves to heat and thereby tends to actuate said element.

4. An electric switch comprising an expansible and contractible element, and an electrical liquid contactor, including co-operating electrodes of opposite polarity, said element being fixed at one end and free at its other end and said electrical liquid contactor being wholly supported upon said free end.

5. An electric switch comprising a coiled expansible and contractible element and an electrical liquid contactor, including cooperating electrodes of opposite polarity, said element being fixed at one end and free at its other end and said electrical liquid contactor being wholly supported upon said free end, and means for adjusting the angular position of said element and said contactor.

6. An electrical switch comprising a coiled tube filled with a volatile fluid, and a rotatable electrical contactor, said tube being fixed at one end and its other end being free to impart movement as said tube expands and contracts, and said contactor being mounted immediately adjacent to said other end and connected directly thereto so as to rotate about the axis of said tube.

7. An electric switch comprising a coiled expansible and contractible element, a liquid contactor mounted at the inner end thereof and tiltable about the axis of said coiled element, and supporting means fixed to the outer end of said element, said supporting means being in turn pivotally mounted in order to provide for adjustment of the angular position of the said liquid contactor.

8. An electric switch comprising a coiled expansible and contractible element, a liquid contactor mounted on the inner end thereof, and adjustable supporting means having in turn a mounting pivoted substantially coaxially with said coiled element in order to provide for adjustment of the angular position of said liquid contactor.

9. A thermostatic switch comprising a heat responsive element, a liquid contactor operable upon being tilted and wholly supported on the free end thereof, and supporting means fixed to the other end of said element, said supporting means being pivotally mounted in order to provide for adjustment of the actuating position of said liquid contactor.

10. An electric switch comprising an expansible and contractible element, a mounting to which one end only of said element is fixed, a tiltable contactor mounted and wholly supported upon the other end of said element, said contactor comprising a container, electrodes therein and a conducting body movable therebetween, and means for adjusting the tilting angle of said contactor.

11. An electric switch comprising an expansible and contractible element in the form of a substantially conical spiral, the end of said element at the base of the conical spiral being fixed, and an electrical contactor wholly and tiltably supported upon the end of said element at the apex of the conical spiral.

12. A thermostatic electric switch comprising a coiled thermostatic element having only one of its ends fixed, a liquid contactor operable on being tilted and supported wholly upon the other end of said thermostatic element, and means for adjusting the angular position of said liquid contactor thereby permitting said thermostatic element to tilt said contactor at predetermined temperatures.

13. A thermostatic switch comprising a coiled thermostatic element having only one of its ends fixed, a liquid contactor operable on being tilted wholly carried by and mounted upon the free end of said thermostatic element, and means for adjusting the angular position of said liquid contactor to permit said thermostatic element to operate it at different predetermined temperatures.

14. An electrical device comprising a coiled expansible and contractible element, a mounting member, a bracket mounted on said mounting member and having one end only of said element secured thereto, a liquid contactor operable on being tilted and mounted at the other end of said element, said bracket being adjustable for varying the angular position of said liquid contactor thereby permitting said element to operate said liquid contactor under predetermined conditions.

15. An electrical device comprising a spirally coiled expansible and contractible element, a mounting member, a bracket adjustably pivoted upon said mounting member, the outer end of said element being secured to said bracket, and a liquid contactor mounted at the inner end of said element at its axis and connected to said inner end whereby movement is imparted thereby to actuate said liquid contactor.

16. An electrical device comprising a coiled expansible and contractible element, a mounting member, a bracket pivoted upon said mounting member, one end of said coiled element being secured to said bracket, and a liquid contactor mounted at the other end of said element and connected thereto whereby movement of said other end may be imparted to said liquid contactor for tilting the latter.

17. An electrical device comprising a coiled actuating element, a mounting member, a bracket adjustably secured to said mounting member, one end of said element being secured to said bracket, and a liquid contactor wholly supported upon and carried by the free end of said element.

18. A thermostatic switch comprising a thermostatic coil, a mounting member, a bracket pivotally secured to said mounting member, the outer end of said coil being attached to said bracket, and a liquid contactor wholly supported upon the free end of said coil.

19. An electrical device comprising a thermostatic spirally coiled element, a mounting member, a bracket pivoted thereto, the outer end of said element being attached to said bracket, and a liquid contactor disposed at the axis thereof, said contactor being wholly supported upon the free end of said element.

20. A thermostatic switch comprising a coiled actuating element, a liquid contactor operable upon being tilted and mounted upon the free end of said coiled element adjacent to the axis thereof, and supporting means to which the other end of said coiled element is attached, said supporting means being adjustable to provide for adjustment of the tilting angle of said contactor.

21. An electrical device comprising a thermostatic coil, a liquid contactor operable upon being tilted and mounted adjacent to the axis thereof and wholly supported upon the free end of said coil, supporting means to which the other end of said coil is secured, said supporting means being adjustable in order to provide for varying the actuating position of said contactor, and electrical connections for said contactor constituting said coil as a part thereof.

22. An electric switch comprising an actuating element having only one end thereof fixed, a tiltable liquid contactor being mounted and wholly supported upon the free end of said element, said contactor comprising a container, electrodes therein and a conducting body movable therebetween, and means for adjusting said actuating element whereby the tilting angle of said contactor for opening and closing its associated electric circuit may be varied.

23. An electric switch comprising a heat responsive actuating element having only one end thereof fixed, a tiltable contactor mounted and wholly supported upon the free end of said element, said contactor comprising a container, electrodes therein and a conducting body movable therebetween, said heat responsive element serving to tilt said contactor under the influence of temperature changes to which it may be subjected.

24. A thermostatic switch comprising a thermostatic element, a mounting to which only one end of said element is fixed, a tiltable contactor secured to and wholly supported upon the free end of said element, said contactor comprising a container, electrodes therein, and a conducting body movable therebetween, and means for adjusting said thermostatic element whereby the tilting angle of said contactor may be varied.

25. An electrical switch comprising a coiled expansible and contractible element, and a rotatable electrical contactor, said element being fixed at one end and being free at its other end to impart movement as said element expands and contracts and said contactor being mounted immediately adjacent to said other end and connected directly thereto so as to tilt about the axis of said element by the movement imparted by said other end.

26. An electrical switch comprising a coiled expansible and contractible element, an electrical contactor, said element being fixed at one end and being free at its other end to impart movement as said element expands and contracts and said contactor being mounted adjacent to and tiltable about the axis of said element and being tiltable by the movement imparted by said other end, and adjustable means for varying the position of the fixed end of said element for varying the tilting angle of said contactor.

27. An electrical switch comprising a spirally coiled expansible and contractible element, an electrical contactor mounted adjacent to and tiltable about the axis of said element, said element being fixed at its outer end and being free at its inner end to impart tilting movement to said contactor as said element expands and contracts, and means for adjusting the position of the fixed outer end of the said element thereby varying the tilting angle of said contactor.

28. An electric temperature control switch comprising a heat sensitive element responsive primarily to the ambient temperature to be controlled, an electrical contactor, a holder therefor adapted to be moved in response to temperature changes to which said heat sensitive element is subjected, and means for additionally thermally influencing said heat sensitive element through the medium of the electric current flowing through said electrical contactor.

29. An electrical temperature control switch comprising a heat sensitive element responsive primarily to the ambient temperature to be controlled, a member associated therewith and moved thereby in response to temperature changes to which said heat sensitive element is subjected, and an electrical contactor carried by said member, said heat sensitive element being thermally influenced additionally by the current flowing through said electrical contactor and said additional thermal influence being discontinued when said electrical contactor moves to open circuit position.

30. A control mechanism for maintaining the temperature of an ambient medium substantially uniform comprising in combination with electric switching means, of a temperature responsive device responsive primarily to the temperature of the ambient medium which temperature is to be controlled to substantial uniformity, and means operatively connecting said device and said switching means, the latter being operated to one position by said device when the latter responds to a change in one direction of the temperature of the ambient medium for maintaining said temperature within the normal range to establish substantial uniformity thereof, such operation of the switching means also controlling the transmission of auxiliary heat to said device whereby said device will respond to the combined effect of the temperature of the ambient medium and the auxiliary heat to operate the switching means to its other position at a different point in the range of the ambient temperature than would be the case if the device was responsive only to the temperature of the ambient medium to the exclusion of the auxiliary heat.

31. A control mechanism for maintaining the temperature of an ambient medium substantially uniform comprising in combination electric switching means, and a thermal actuator primarily responsive to the temperature of the ambient medium operatively connected to said switching means and adapted to move the same to circuit opening and closing positions in response to changes in the temperature of the ambient medium under control, actuation of said switching means to one of its positions being effected solely by the temperature of the ambient medium and when moved to said position then controlling the transmission of auxiliary heat to said actuator whereby the switching means will be operated to its other position in response to the combined action upon said actuator of the auxiliary heat and the temperature of the ambient medium under control.

32. A control mechanism for maintaining the temperature of an ambient medium substantially uniform comprising in combination electric switching means, and a thermal actuator responsive primarily to the temperature of the ambient medium to be controlled and operatively connected to said switching means for actuating the same to circuit opening and circuit closing positions, the said actuator solely operating said switching means to both positions by reason of its physical distortion arising from its own temperature, movement of said switching means by said actuator to one of its positions being effected solely by the temperature of the ambient medium whereby when said switching means is moved to said first position the transmission of auxiliary heat to said actuator is controlled whereby it then becomes responsive to the combined action of the temperature of the ambient medium to be controlled and the auxiliary heat for moving said switching means to its other position.

33. A control device for maintaining the temperature of an ambient medium substantially uniform comprising in combination electric switching means, and a thermal device influenced primarily by the ambient temperature being operatively connected thereto for actuating the same, said thermal device moving said switching means to circuit closed position solely as a result of a fall in the ambient temperature to be controlled to restore said temperature to substantially normal value, the closing of said switching means, controlling an auxiliary supply of heat to said device whereby it actuates said switching means to open position as a result of the combined action of a rise in the ambient temperature to be controlled and the auxiliary heat.

34. A control device for maintaining the temperature of the ambient medium substantially uniform comprising in combination a thermal device primarily influenced by the ambient temperature, and electric switching means actuated thereby, said thermal device solely by reason of its own physical distortion moving said switching means to closed position when the ambient temperature to be controlled falls to a predetermined level for restoring the ambient temperature to substantially its normal degree, the closing of said switching means establishing current flow through said thermal device for auxiliary heating the same whereupon the thermal device is subject to the ambient temperature to be controlled and the auxiliary heat for actuating said switching means to circuit opening position.

35. In a control device, electric switching means for controlling the ambient temperature of a space to be heated, a thermal responsive device primarily influenced by the temperature of the space to be heated and operatively connected to said switching means whereby the switching means is actuated to circuit closed position by said actuator in response solely to a fall in the ambient temperature to a predetermined point, the closing of said switching means causing auxiliary heating of the thermal responsive device which is additive to the ambient temperature of the space to be heated for influencing said thermal device whereby the switching means is actuated to open position before the ambient temperature of the space to be heated rises to that point at which said switching means would otherwise be opened.

36. A thermostatic device for controlling an electric circuit comprising a heat operated element including a thermostatic metallic coil, a circuit closing device including a tiltable vessel, terminals and a fluent conductor therein, means intermediate said circuit closing device and said heat operated element for operating the former to break the circuit by the heat expansion of the latter and means for varying the point at which the said intermediate means will cause circuit breaking movement of said device without changing the relative positions of said device and said element.

LOUIS A. M. PHELAN.
CLIFFORD HOTCHKISS.

DISCLAIMER

Re. 19,235.—*Louis A. M. Phelan*, Chicago, Ill., and *Clifford Hotchkiss*, Elkhart, Ind. ELECTRICAL APPARATUS. Patent dated July 10, 1934. Disclaimer filed May 28, 1941, by the assignee, *The Brown Instrument Company*.

Hereby enters this disclaimer to claims 31, 32, 33, and 35 in said specification.

[*Official Gazette June 24, 1941.*]

marily influenced by the temperature of the space to be heated and operatively connected to said switching means whereby the switching means is actuated to circuit closed position by said actuator in response solely to a fall in the ambient temperature to a predetermined point, the closing of said switching means causing auxiliary heating of the thermal responsive device which is additive to the ambient temperature of the space to be heated for influencing said thermal device whereby the switching means is actuated to open position before the ambient temperature of the space to be heated rises to that point at which said switching means would otherwise be opened.

36. A thermostatic device for controlling an electric circuit comprising a heat operated element including a thermostatic metallic coil, a circuit closing device including a tiltable vessel, terminals and a fluent conductor therein, means intermediate said circuit closing device and said heat operated element for operating the former to break the circuit by the heat expansion of the latter and means for varying the point at which the said intermediate means will cause circuit breaking movement of said device without changing the relative positions of said device and said element.

LOUIS A. M. PHELAN.
CLIFFORD HOTCHKISS.

DISCLAIMER

Re. 19,235.—*Louis A. M. Phelan*, Chicago, Ill., and *Clifford Hotchkiss*, Elkhart, Ind. ELECTRICAL APPARATUS. Patent dated July 10, 1934. Disclaimer filed May 28, 1941, by the assignee, *The Brown Instrument Company*.

Hereby enters this disclaimer to claims 31, 32, 33, and 35 in said specification.

[*Official Gazette June 24, 1941.*]